United States Patent [19]
Davidson et al.

[11] Patent Number: 4,590,829
[45] Date of Patent: May 27, 1986

[54] FOOD SLICING METHOD AND APPARATUS

[75] Inventors: Arthur R. Davidson, Canby; Richard S. Livermore, Oregon City, both of Oreg.

[73] Assignee: Amfac Foods Monterey, Inc., San Francisco, Calif.

[21] Appl. No.: 621,215

[22] Filed: Jun. 15, 1984

[51] Int. Cl.$^4$ .............................................. B26D 1/53
[52] U.S. Cl. ......................................... 83/22; 83/402; 83/425.4; 83/497; 99/645
[58] Field of Search ............. 83/22, 425.4, 402, 425.2, 83/497; 99/648, 643

[56] References Cited

U.S. PATENT DOCUMENTS

| | | |
|---|---|---|
| 1,991,757 | 2/1935 | Lorentz . |
| 1,994,137 | 3/1935 | Leguillon . |
| 2,021,300 | 11/1935 | Gardner ............................ 83/425.4 |
| 2,082,872 | 6/1937 | Chambers . |
| 2,178,920 | 11/1939 | Savery . |
| 2,836,889 | 6/1958 | Joyet et al. . |
| 2,978,003 | 4/1961 | Benekam . |
| 3,173,325 | 3/1965 | Warren et al. . |
| 3,279,296 | 10/1966 | Jung et al. . |
| 3,651,728 | 3/1972 | Young . |
| 3,788,176 | 1/1974 | Glass . |
| 3,886,858 | 6/1975 | Evans et al. . |
| 3,899,948 | 8/1975 | Jakob . |
| 4,059,037 | 11/1977 | Gerson et al. . |
| 4,138,940 | 2/1979 | Fujii ................................. 99/643 X |
| 4,232,577 | 11/1980 | Wallmann et al. ............... 83/497 X |
| 4,330,092 | 5/1982 | Roman . |

Primary Examiner—Donald R. Schran
Attorney, Agent, or Firm—Klarquist, Sparkman, Campbell, Leigh & Whinston

[57] ABSTRACT

A food slicing method and apparatus includes blades mounted on a shaft for rotation therewith, the blades successively converging and diverging to slice the food pieces as the shaft rotates. An inlet flume conveys the food pieces to and through the rotating blades. A flighted conveyor within the flume submerges the food pieces at the flume inlet and releases them at the bottom of the flume to float upward, oriented according to their buoyancy before entering the blades. In one embodiment, the blades are mounted on a curved shaft which rotates about a longitudinal axis of symmetry to cause the blades to converge on the inward side of the shaft and diverge on the outward side. The blades engage a synchronously counterrotating drum to slice the food pieces as they enter on the inward side of the shaft. As the blades diverge, the majority of the slices fall free of the blades. Those that adhere are discharged from between the blades by jets of water sprayed from a water cleaning comb on the outward side of the shaft. In a second embodiment, the blades are mounted on a straight rotating shaft. Guide plates on the ends of the shaft angle toward each other to press the blades inward on one side of the shaft. The blades slidably adjust on the shaft as it rotates to converge on the one side and diverge on the other side.

18 Claims, 13 Drawing Figures

FOOD SLICING METHOD AND APPARATUS

BACKGROUND OF THE INVENTION

This invention relates generally to a method and apparatus for slicing fruits and vegetables including mushrooms. Particulary, it relates to such method and apparatus having a plurality of rotating cutter blades for slicing mushrooms that are conveyed to and through the rotating blades.

Mushroom slicing method and apparatus previously used in the industry as shown U.S. Pat. No. 2,178,920 to Savery issued Nov. 7, 1939, and U.S. Pat. No. 2,978,003 to Benekam issued Apr. 4, 1961, have encompassed sets of intermeshing rotating cutting blades set within a tank of flowing water. In Savery, the blades are mounted parallel to each other on a horizontal rotating shaft whose axis of rotation is perpendicular to the direction of water flow within the tank. Mushrooms are dumped into one end of the tank and are carried by the flow into the intermeshing vertical blades which coact to slice the mushrooms. Most mushrooms entering the blades float in an upright position with their heads up and stems down and are sliced along their vertical axes accordingly. The water current carries the emerging slices to the other end of the tank where they are removed.

In the Benekam patent, by contrast, the blades are mounted on a vertical shaft and thus are horizontal. The current carries the mushrooms into coacting sets of parallel blades which slice the upright mushrooms entering them perpendicular to their vertical axes.

A principal disadvantage of such prior mushroom slicing apparatus is that mushroom slices tend to become wedged between the blades rather than pass through them. The slices are compressed between blades, and their resiliency causes them to bind. Unless the slices are continuously removed, the spaces between the blades become clogged, impairing the effectiveness of the subsequent slicing action. Scraping the slices from between the blades and shaft is one approach, shown in U.S. Pat. No. 3,788,176 of Glass issued Jan. 29, 1974. But at least some of the mushroom slices are bruised and damaged by the force of the scraper.

Another drawback of prior mushroom slicing apparatus arises because of the intermeshing blades. These blades overlap with a fine tolerance and eventually are driven out of alignment as they slice through the mushrooms. To preserve the blades and assure optimum slicing of the mushrooms, the slicing apparatus must be shutdown regularly to realign or replace the blades.

Also in the prior devices, a significant share of mushrooms are not fed into the blades oriented for optimum slicing, i.e., parallel to the stem axis. Improperly sliced mushrooms are of a lower value and must be separated from the other slices, a time-consuming and costly process.

SUMMARY OF THE INVENTION

A primary object of the present invention is to provide an improved method and apparatus for slicing food such as mushrooms at a high rate.

Another object of the invention is to provide such a mushroom slicing method and apparatus in which the mushrooms are optimally sliced.

A further object of the invention is to provide such a slicing method and apparatus in which a single set of rotating blades accurately slices mushrooms.

Yet another object of the invention is to mount adjustably the blades for maintaining their slicing efficiency and for ease of replacement.

Still another object of the invention is to provide such a slicing method and apparatus which releases the sliced mushrooms from between slicing blades without damage.

The foregoing and other objects, features, and advantages of the invention will become more readily apparent hereinafter.

A slicing apparatus in accordance with the present invention comprises a set of spaced-apart circular blades mounted along a shaft for rotation therewith. The blades are positioned on the shaft to converge and diverge successively as they rotate about the shaft. Food pieces are sliced at a point just following the closest approach of the blades to each other, the blades thereafter diverging to facilitate the removal of the sliced pieces. Means convey the food pieces, such as mushrooms, in a preferred position to the rotating blades which engage an opposed drum to slice the pieces. The slices are further conveyed beyond the blades for collection.

In a preferred embodiment of the invention, the center section of the shaft is made of a flexible material. It is fitted to rigid extensions mounted in blocks to rotate the center section in a bowed configuration about a curved lengthwise axis of symmetry. The blades are concentrically mounted on the curved portion of the shaft, the bowing of the shaft causing them to converge as they rotate toward the inward side of the shaft and diverge as they rotate toward the outward side of the shaft.

The shaft and blades form part of a removable cutting head assembly which has swingable support arms for lifting the assembly free of the apparatus. A lever removably attached to the upper end of each arm is adjustable for positioning the assembly to maintain engagement between the blades and the drum as the edges of the blades recede from wear.

In a second embodiment, the blades are mounted in a fanned configuration on a straight shaft. Guide flanges resting on bearings are mounted outside each outermost blade to press the blades together on one side of the shaft, allowing them to diverge on the opposite side. The blades are dimensioned slidably to adjust along the rotating shaft to hold their orientation.

In each embodiment, resilient spacer means are inserted between the blades to maintain proper spacing of the blades. A stabilizing comb is preferably provided to align continuously the blades by fingers which penetrate between the blades just above the mushroom's entry point. On the opposite side of the shaft, a water cleaning comb with penetrating fingers is positioned. Water is sprayed from the ends of the fingers of the cleaning comb to wash any adhering mushroom slices from the blades and shaft.

The conveying means includes a flume through which water flows to deliver the mushrooms to the blades. After the slices are discharged from between the blades, they are carried by the stream of water onto a meshed conveyor which removes them from the apparatus. The water drains through the conveyor into a collecting tank. From there, a pump recirculates the water to the flume.

Within the flume, an inclined conveyor means submerges the mushrooms to a predetermined depth. When released, the mushrooms orient themselves with their caps up and stems down as they float toward the surface of the water and enter the blades in this desired position.

The present invention offers a significant improvement in the slicing of mushrooms. The mushrooms are oriented in the preferred slicing position. The circular blades mounted on the shaft diverge after the slicing to break the adhesion of the slices to the blades and allow the majority to fall away. The penetrating spray from the cleaning comb removes those slices that remain. The opposing drum with annular grooves guides the blades, increasing the accuracy of slicing operation. The slicing with a single set of blades engaging the drum avoids the need for frequent adjustment and realignment required of intermeshing blades.

DETAILED DESCRIPTION

A Preferred Embodiment

Figure 1:
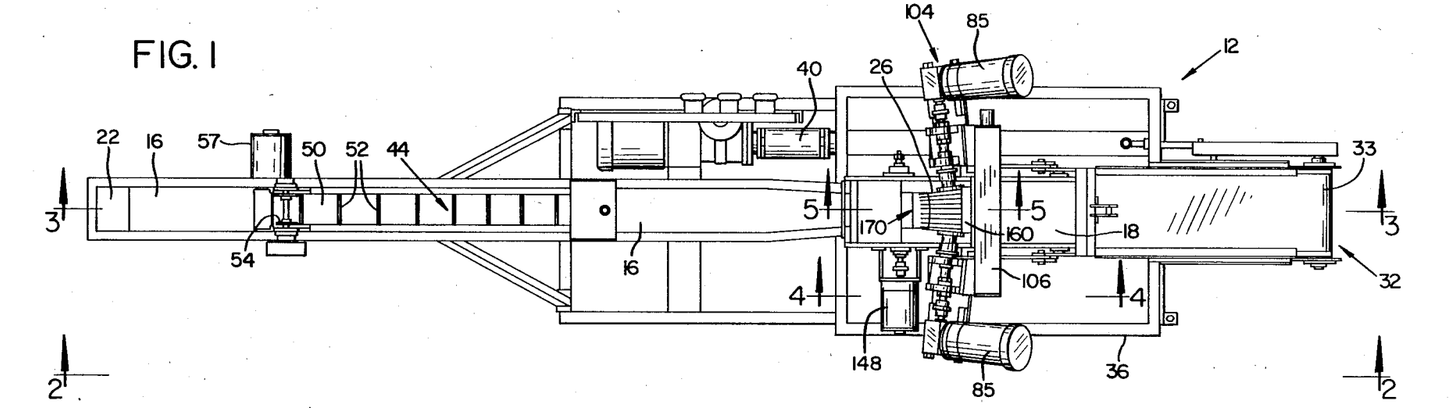
FIG. 1 is a top view of a mushroom slicing apparatus in accordance with the preferred embodiment of the invention
Figure 2:
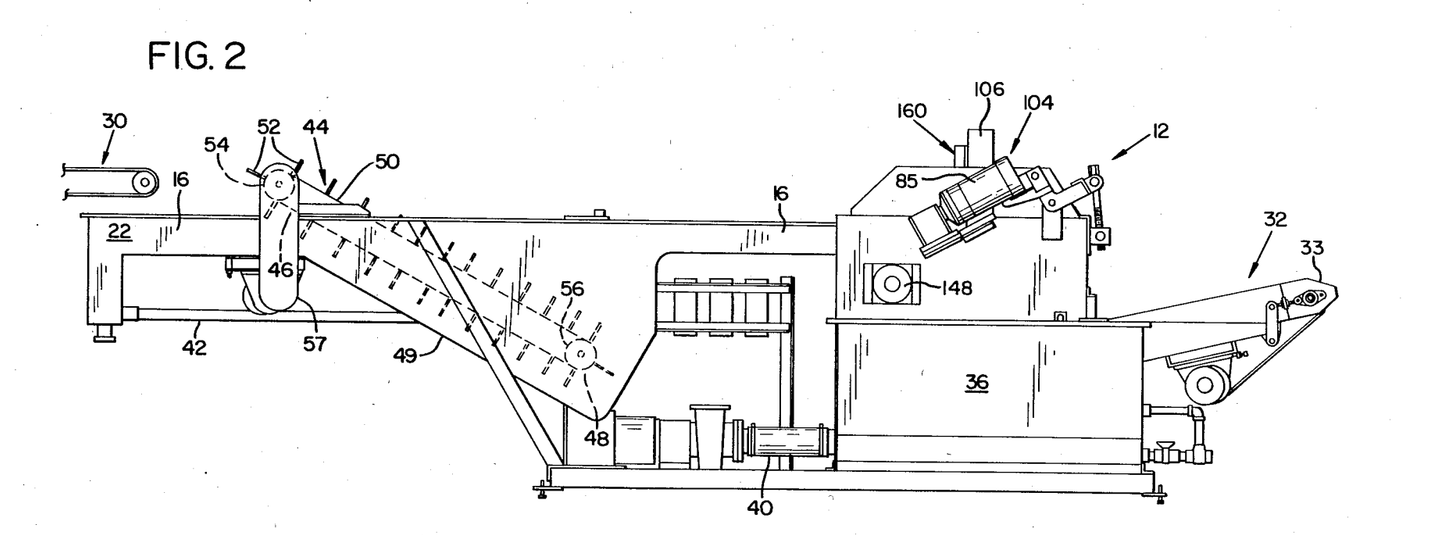
FIG. 2 is a side view taken along the line 2—2 of FIG. 1.
Figure 3:
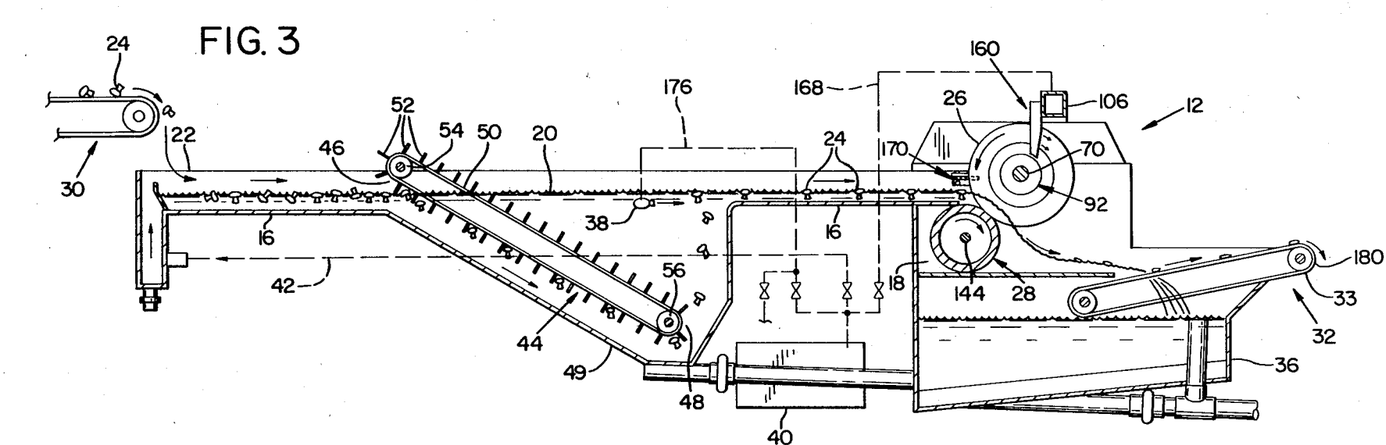
FIG. 3 is a schematic view in section of the apparatus taken along the line 3—3 of FIG. 1.

Referring to FIGS. 1-3, a mushroom slicing apparatus 12 according to the preferred embodiment includes an inlet flume 16 through which water 20 flows from an infeed end 22 to carry mushrooms 24 to a set of rotating circular slicing blades 26 which bear against an anvil roll or drum 28. The mushrooms to be sliced are fed at a continuous even rate to the flume 16 by suitable means, indicated herein as comprising a belt conveyor 30. The water flows through the blades 26, carrying the mushrooms slices into a receiving flume 18 and onto an discharge conveyor 32 which preferably is an endless metal mesh belt 33 that retains the slices while allowing the conveying water to drain through into a tank 36. A pump 40 recirculates the water flow from the tank 36 back to the flume 16 through a pipe 42.

Means are provided in the flume 16 to submerge the mushrooms carried therein. The illustrated means comprises an inclined conveyor 44. The conveyor 44 has an inlet end 46 positioned above the water in the flume and an outlet end 48 positioned in a depressed tank-like part 49 of the flume about 18 inches below the surface of the water. The conveyor comprises a belt 50 extending the width of the flume and having a plurality of longitudinally spaced conveyor flights 52 attached thereto. The belt 50 is trained around suitable drive rollers 54, 56 driven by a motor 57 to propel the belt 50 in a counter-clockwise direction as viewed in FIG. 3. Whole mushrooms carried by the water 20 into the spaces between flights 52 are propelled by the conveyor 44 to its bottom end 48. There, the mushrooms are released and allowed to float upward. Because of the greater buoyancy of the enlarged head of the mushroom, it tends to orient itself head up as it floats upwardly toward the surface of the water. A submersive depth of about 18 inches is sufficient to permit almost all the mushrooms to assume this preferred orientation. Immediately upstream from where the mushrooms break the surface, a nozzle 38 is positioned to maintain the flow of water through the flume 16. The water flow carries the mushrooms toward the cutting blades 26.

Because of the orientation attained in the flume, the mushrooms are sliced by the blades 26 along planes extending generally parallel to the axis of the mushroom stems. Without this process of submerging and releasing the mushrooms from under water, many of the mushrooms would enter the blades 26 in various positions indicated in FIG. 3 in the infeed end 22 of the flume and be sliced accordingly.

Means are provided to mount the blades 26 to cause their peripheries to converge and diverge successively as the blades rotate. Referring to FIGS. 4-7, the cutting blades 26 are mounted concentrically on the center section 70 of a curved or bowed shaft 72 positioned over the spill end 74 of the flume 16. The shaft section 70 is composed of flexible resilient material such as polyurethane, such that it can rotate about a curved axis of symmetry 76 lying in a plane indicated in FIG. 4 by the dotted line 77 inclined at an angle of about 60° to the vertical and approximately tangential to the surface of the drum 28. Each end of the section 70 is fitted into a cylindrical cup 68 forming one end of a rigid metal shaft extension 78. The shaft extensions are each rotatably supported in a pair of pillow blocks 80, 82 rigidly mounted on suitable support brackets 84 at the respective sides of the apparatus. The support brackets are adjustably mounted to support plates 83 to adjust the angle of the extensions 78 toward each other and thereby the extent of bow in the shaft center section 70. The shaft 72 is driven at each end by synchronized motors 85 mounted to reducers 86 bolted to the outer ends of each support bracket 84.

With the shaft so mounted, the center section 70 deforms to allow the shaft axis of symmetry 76 to maintain its curved orientation. The flexible material expands on the outward side 87 of the section 70 and compresses on the inward side 88.

Figure 7:
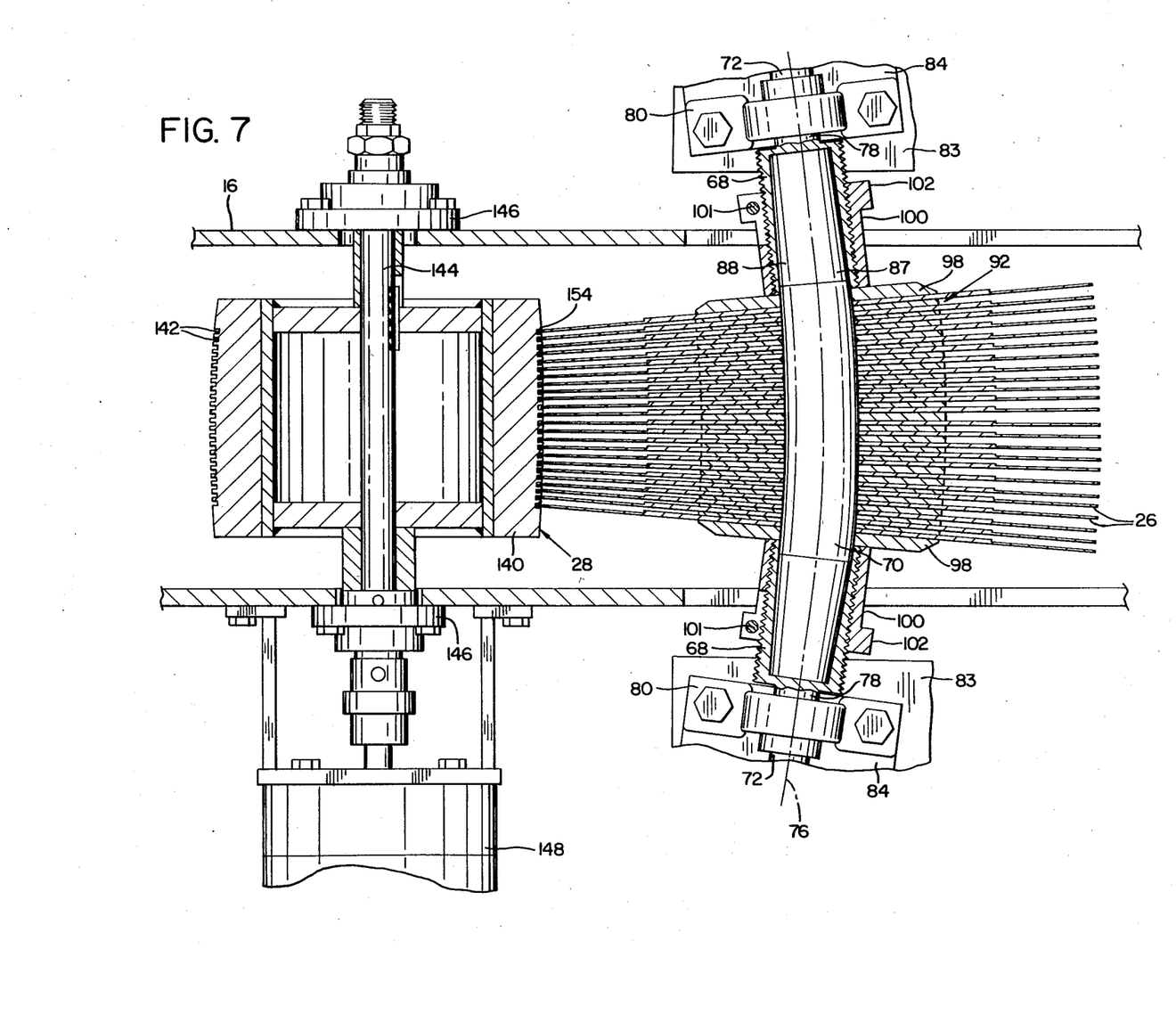
FIG. 7 is a fragmentary sectional view of the cutter head assembly taken along the line 7—7 of FIG. 4.
Figures 9, 10, 11:
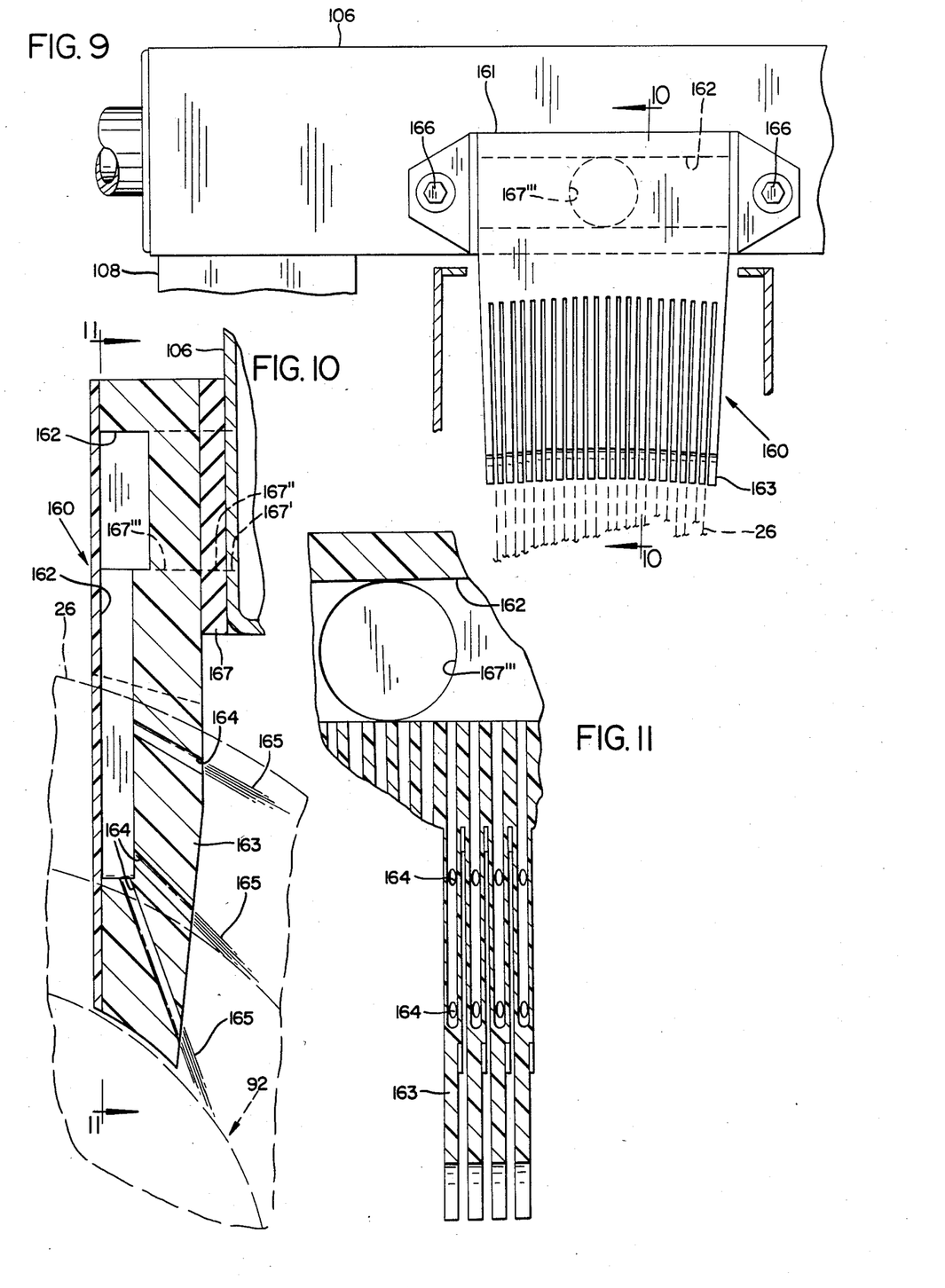
FIG. 9 is a fragmentary view taken along line 9—9 of FIG. 5 showing the cleaning comb.
FIG. 10 is an enlarged sectional view taken along line 10—10 of FIG. 9.
FIG. 11 is a sectional view of the cleaning comb taken along line 11—11 of FIG. 10.

The blades 26 are mounted on the shaft section 70 in parallel, evenly spaced relation while the shaft is dismounted from its supporting pillow blocks 80, 82, as will be described. However, the curve of the shaft in its mounted position causes the blade to converge on the inward side 88 of the curve and fan apart on the outward side 87 of the curve, as best seen in FIG. 7. The spacing between adjacent blades 26 may, for example, vary from 0.200 inch between the cutting edges of the blades at the narrowest point on the inward side 88 of the shaft to a spacing of 0.260 inch at the their greatest spacing on the outward side 87 of the shaft.

Figures 5, 8:
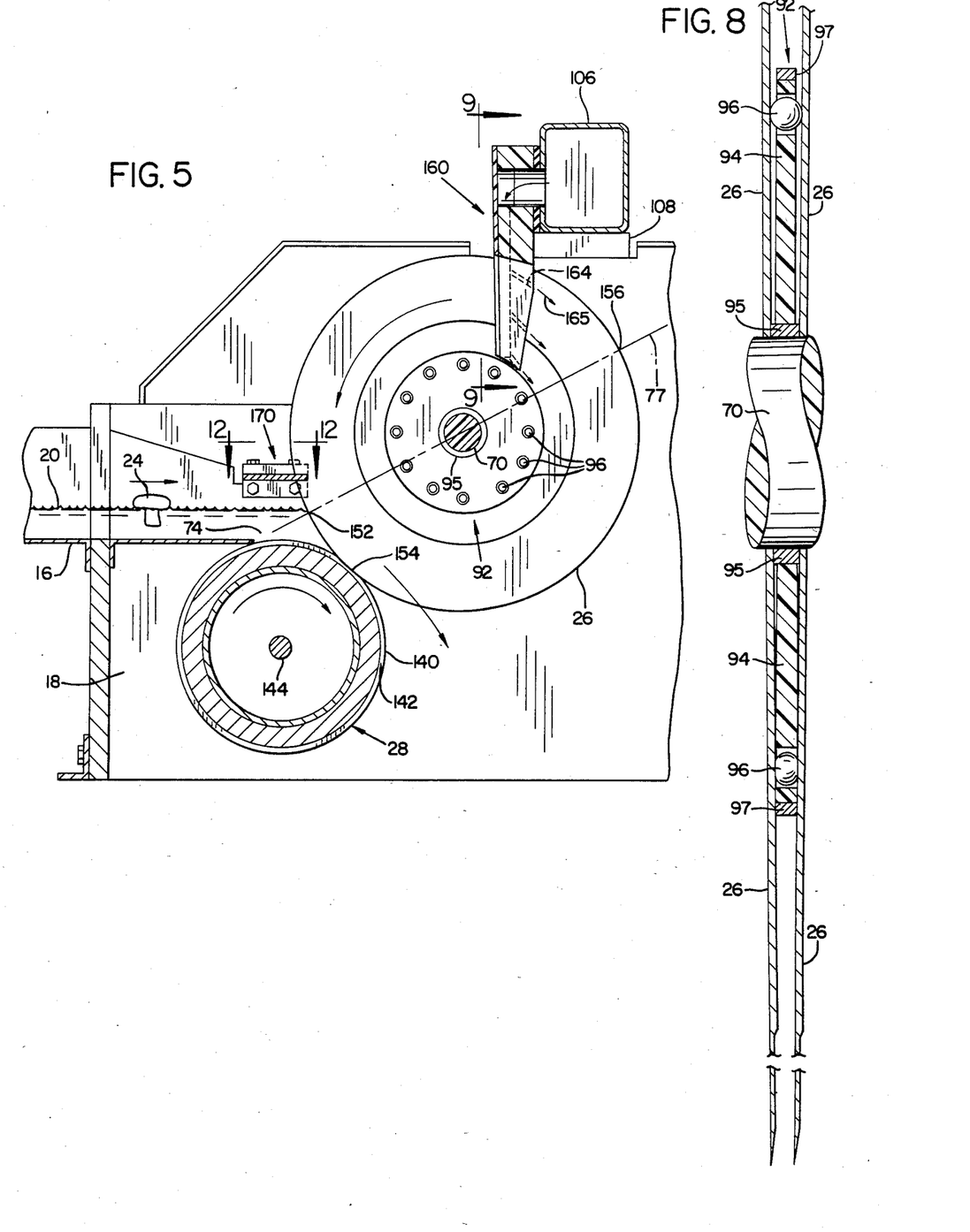
FIG. 5 an enlarged sectional view taken along line 5—5 of FIG. 1.
FIG. 8 is an enlarged fragmentary view of the shaft and a pair of blades showing the arrangement for maintaining spacing between blades.

As more clearly seen in FIGS. 5 and 8, between each pair of blades 26 is mounted an intervening spacer 92 to maintain the separation of the blades. Each spacer 92 comprises a spacing disc 94 of a rigid material such as polycarbonate with an inner hub 95 and an outer ring 97 of stainless steel. The disc 94 has a plurality of equiangularly spaced holes therethrough. In each of the holes is mounted a resilient spacer member 96 which protrudes outwardly from the opposite side surfaces of the disc and into contact with the adjacent cutting blades. The resilient members 96 press against and guide the blades to prevent their wobbling while they rotationally converge and diverge. The members 96 may be of any suitable resilient material and preferably comprise rubber balls. They compress as the blades converge on the inward side 88 of the shaft and expand to urge the blades apart on the outward side 87 of the shaft.

Figure 6:
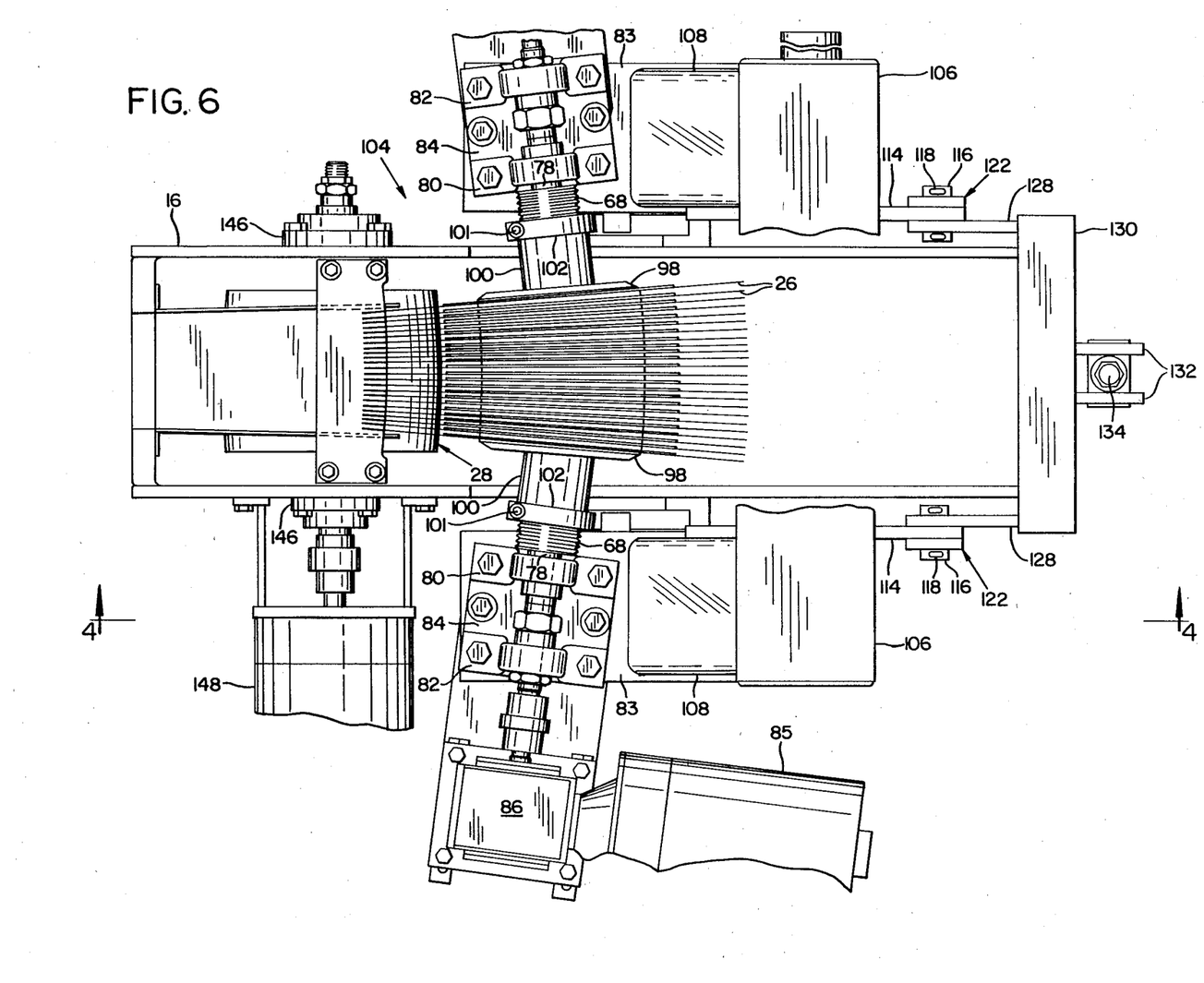
FIG. 6 is a fragmentary top view of the cutter head assembly and drum with cutter head raised to its removal position.

Referring to FIGS. 6 and 7, the assembly of the cutting blades 26 and the spacers 92 is retained in position on the shaft 70 by a pair of metal guide flanges 98, one mounted outside each outermost cutting blade and held in position by a cylindrical stainless steel adjustment bushing 100. Each bushing is adjustably threaded into position on the outside of the cylindrical cup end 68 of each shaft extension 78 to press the flanges 98 firmly against the blades 26. One end of the bushing 100 is formed as a notched collar 102 through which a set screw 101 extends. Tightening the screw locks the bushing in position on the cup 68.

The blades 26, spacers 92, and guide flanges 98 are frictionally secured to the section shaft 70 in their retained position by a binding fit resulting from the out-of-round deformation of the section in its mounted position. In its dismounted position, the center section is straight, with a diameter a few mils less than the inner diameter of the blades, spacers, and flanges. They are slipped onto the shaft and positioned by adjusting the bushings 100. Upon bending the shaft 70 for mounting it in the pillow blocks 80, 82, the resulting out-of-round deformation widens the shaft relative to the mounted blades, spacers, and flanges, binding them in place to rotate with the shaft.

Figure 4:
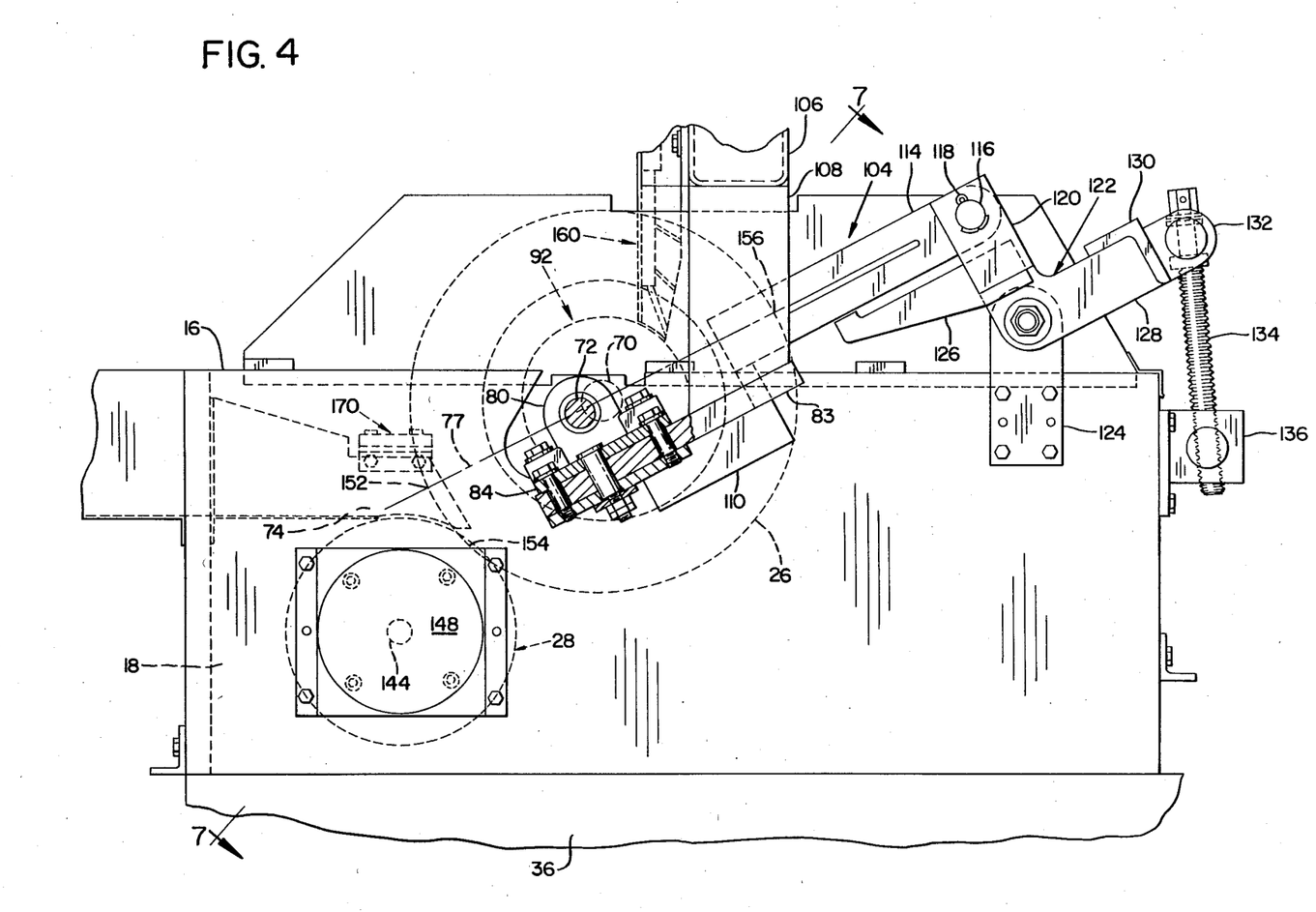
FIG. 4 is an enlarged, fragmentary sectional view taken along the line 4—4 of FIG. 1 showing the details of the mounting of the cutter head assembly, the latter being shown in phantom in slicing position with the underlying drum.

Referring to FIGS. 4 and 6, the blades 26 and shaft 72 form part of a removable cutter head assembly 104 which can be removed from the machine for sharpening or replacing the blades. FIG. 4 shows the assembly in its slicing position within the frame. FIG. 6 shows a top view of the assembly in its elevated position for facilitating replacement of the blades. The assembly can also be adjustably positioned to maintain contact between the blades 26 and drum 28. The cutter head assembly 104 includes a tubular member or bridge 106 which extends across the frame above the blades 26. The bridge 106 is supported at each end by tubular support members 108 fixed to the support plates 83. The support plates 83 rest upon support blocks 110 fixed to the apparatus frame at each side thereof. Welded to the inner side of each support member 108 is one of a pair of support arms 114 which extend angularly upwardly from the member 108 in the operative position of the apparatus. Each of the arms 114 is removably connected at its upper end by a pivot pin 116 and cotter keys 118 to an arm 120 of an L-shaped lever 122. The levers 122 are pivotally mounted onto the sides of the flume on stationary bearing plates 124. Stops 126 welded to each arm 120 bear against each support arm 114 when the levers 122 are pivoted clockwise, as viewed in FIG. 5, to move the assembly 104 upwardly. The other arm 128 of each lever is welded to a crossbar 130 to the middle of which is welded a jack bearing 132. A threaded spindle 134 extends through the jack bearing and threadedly engages a threaded jack bracket 136 secured to the machine frame.

Turning the spindle 134 so as to cause it to withdraw from the jack bracket 136 causes the bearing 132 and attached lever arms 128 to move upwardly, pivoting the levers 122 counterclockwise. The support arms 114 move to the left, causing the support plates 83 and attached blade assembly to slide across the blocks 110 toward the drum. The cutting blades 26 can thus be maintained in proper position to the suface of the drum 28 by adjusting the spindle 134.

To replace the blades, the cutter head assembly 104 is elevated to swing the blades free of the apparatus frame. The spindle 134 is first rotated to pivot the levers 122 clockwise. The stops 126 rotate clockwise to urge the support arms 114 upwardly, pivoting the assembly 104 upwardly and away from the drum 28, as shown in FIG. 6. Removing the pivot pins 116 and cotter keys 118 from the support arms allows the assembly 104 to be lifted free from the machine and replaced.

The anvil drum 28 is mounted below the cutter head assembly at the discharge end of the flume 16 so that the water 20 flows over the drum. As shown in FIG. 7, the curve of the shaft section 70 causes the edges of the cutting blades 26 to intersect the plane 77 along an arc concentric with the curve of shaft section 70. The drum 28 has a surface layer 140 preferably of bronze such as polyurethane, the surface of which layer is convexly curved longitudinally of the drum complementary to the curvature of the adjacent edges of the cutting blades 26. The surface layer is also formed with a series of slits 142 into which the blades 26 project. The drum 28 is mounted on a shaft 144 rotatably supported on the apparatus frame in suitable bearing mounts 146 driven by a motor 148 so that the drum rotates counter to the rotation of the cutting blades 26 at substantially identical peripheral speed.

Referring now to FIG. 5, the water flowing through the flume 16 is maintained at such height that the mushrooms float with their heads up and stems down above the flume bottom as they approach the cutting blades 26. The flow rate in the flume is preferably maintained so that the blades imbed sufficiently into the impinging mushrooms to carry them down onto the drum 28 where the blades slice entirely through the mushrooms. The shaft 72 is preferably oriented with respect to the drum so that the point of maximum convergence 152 of the blades lies above the drum at the approximate level of impingement by the oncoming mushrooms. With this orientation, the blades spread apart as the slicing is completed at a drum engagement point 154 and continue to spread apart to a point of maximum divergence 156 diametrically opposite the convergence point. The spreading of the blades breaks the adhesion of the mushroom slices to the faces of the blades and allows them to fall from between the blades into the receiving flume 18.

To facilitate and assure removal of the mushroom slices that fail freely to fall from between the blades, means are provided to wash the slices from between the blades. Referring to FIG. 5 and particularly to FIGS.

9-11, the illustrated means comprises a hydraulic cleaning comb 160 mounted on the bridge 106. The comb includes a hollow body portion 161 defining a manifold 162 and hollow fingers 163 which extend one between each pair of blades. The fingers are each formed with openings 164, see FIGS. 10 and 11, to project jets of water 165 downwardly between each blade. The body portion 161 is secured to the bridge 106 by bolts 166 with an intervening gasket 167. The manifold 162 communicates with the interior of the bridge 106 through aligned openings in the bridge, gasket and comb body indicated at 167', 167'', and 167''', respectively, in FIG. 10. Water is pumped into the comb 160 from the tank 36 by the pump 40 through a pipe 168 (FIG. 3), connected to an inlet 169 to the bridge 106. The water jets 165 from the openings 164 spray along the faces of the blades 26 and against the shaft 72 to remove mushroom slices which have adhered to the blades and shaft, causing them to fall into the receiving flume 18. The removal of the slices is facilitated because of the greater spacing between the blades 26 at the finger's location.

Figure 12:
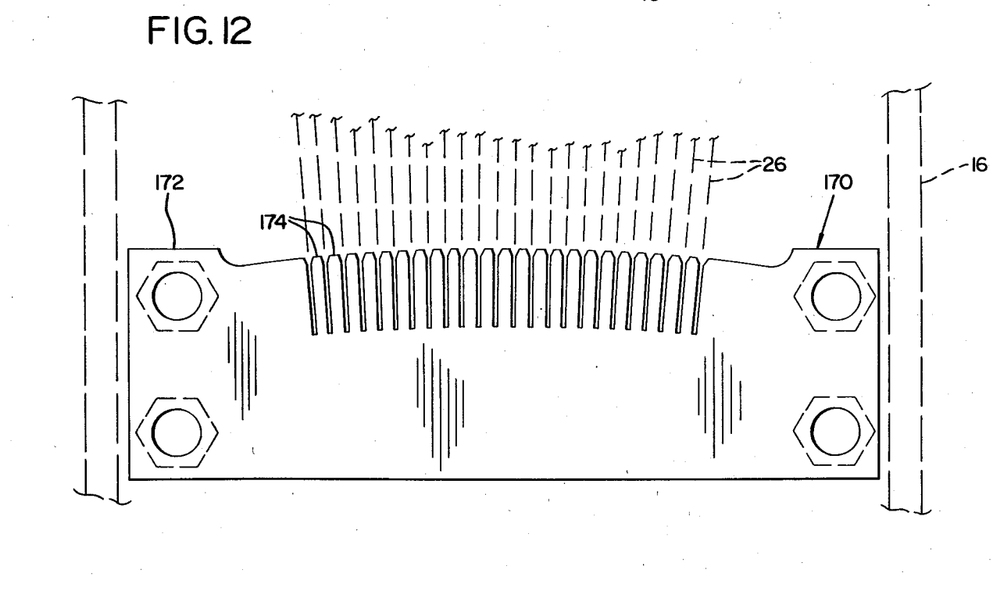
FIG. 12 is a view taken along line 12—12 of FIG. 5 showing the stabilizing comb.

Additional means for stabilizing the blades 26 is shown in FIGS. 5 and 12. Mounted to the apparatus frame over the drum 28 is a stabilizing comb 170. The comb has a body 172 extending the width of the blade assembly and a plurality of guide fingers 174 extending one between each adjacent pair of blades. The fingers are spaced to maintain the blades in uniform alignment as they rotate downwardly toward the mushrooms for slicing.

As indicated earlier, the sliced mushrooms are removed from the apparatus for further processing by the discharge conveyor 32, driven in the clockwise direction viewed from FIG. 3 by conventional means (not shown).

Referring to the schematic of FIG. 3, the water flowing into tank 36 is recirculated by the pump 40 to several points in the apparatus 12. The pipe 42 delivers water to the infeed end 22 of flume 16 to provide the water current for carrying the mushrooms fed into the flume towards the conveyor 44. The pipe 168 delivers water to the cleaning comb 160. A third pipe 176 delivers water to the nozzle 38.

Operation

In operation of the preferred embodiment, whole mushrooms are fed into the infeed end of flume 16 from the conveyor 30 as shown in FIGS. 2 and 3. The water current in the flume carries them toward the conveyor 44, which causes them to be submerged to the bottom of the flume 16. Upon release, they float upward to the surface with the heads above the stems in the preferred position. The surface current carries the desirably oriented mushrooms toward the slicing blades 26 and drum 28.

The mushrooms impinge upon the blades 26 and are sliced by the action of the blades and the drum 28. The blades 26 spread as they slice through the mushrooms, breaking the adhesion of the slices to the blade faces. The water current from the inlet flume 16 carries most of the slices over the drum 28 into the receiving flume 18. Those slices that remain are washed from the blades 26 and the shaft 72 by the water jets 165 emitted from the cleaning comb 160.

The current carries the slices down the receiving flume toward the discharge conveyor 32 by which they are transported to a discharge point 180 as the water drains through the conveyor into the tank 36. From the tank, the pump 40 recirculates the water throughout the apparatus 12.

Second Embodiment

Figure 13:
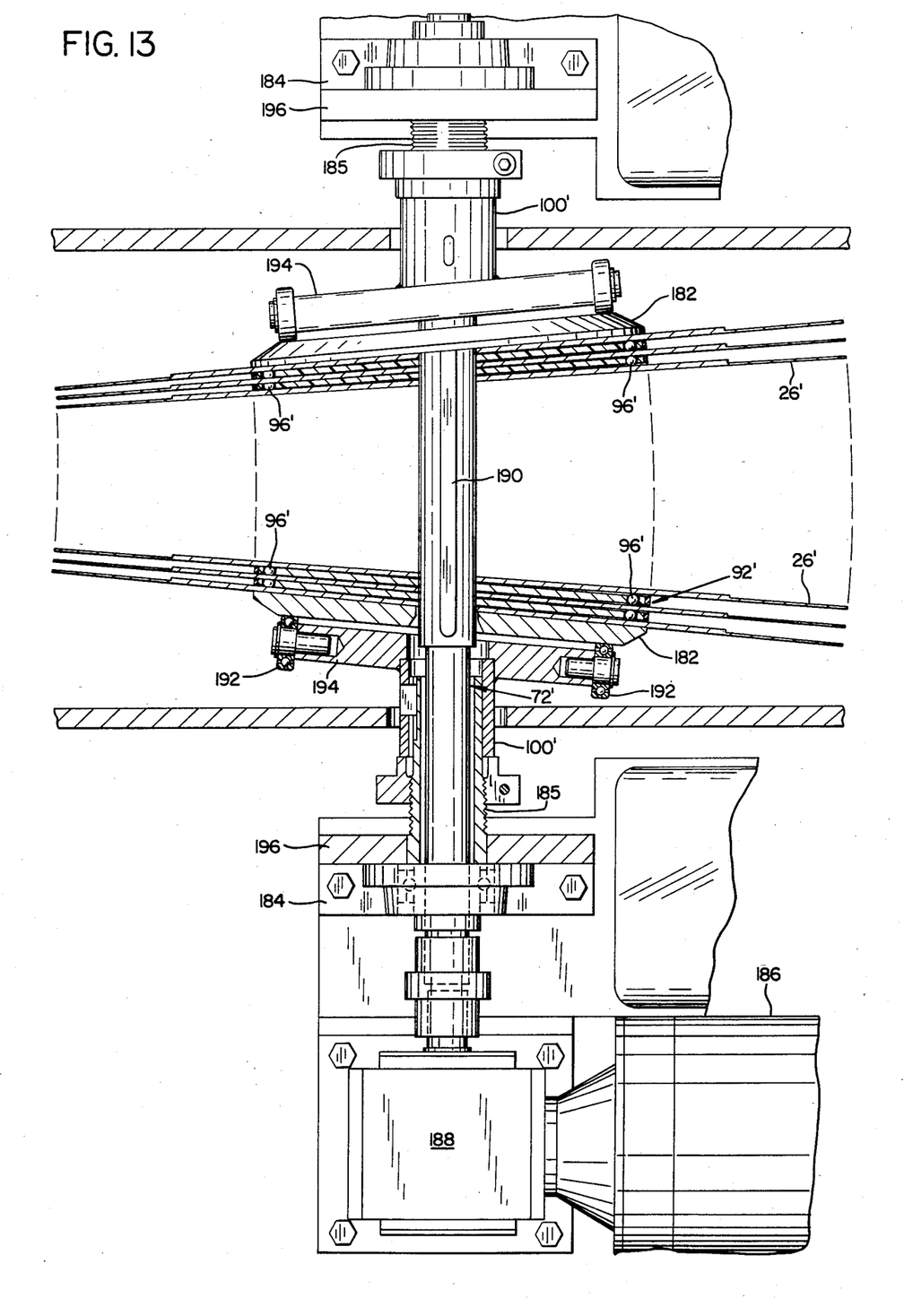
FIG. 13 is a top view partly in section of a second embodiment of the invention comprising blades positioned on a straight shaft.

This embodiment illustrates an arrangement for mounting a plurality of blades 26' on a straight, rigid shaft 72' so that the blades successively converge and diverge as they rotate with the shaft.

Referring to FIG. 13, the circular blades 26' are mounted on a rigid, straight shaft 72' between opposing angularly disposed circular guide plates 182. Each end of the shaft is rotatably supported in a pillow block 184 and driven by a motor 186 through a gearbox 188. As in the first embodiment, spacers 92' provided with resilient members 96' are mounted one between each pair of blades 26' uniformly to space the blades. The blades, spacers, and guide plates have inner diameters slightly larger than the diameter of the shaft, allowing them to slide adjustably along the shaft. A key 190 running longitudinally the length of the shaft 72' matingly engages corresponding key notches (not shown) in the blades 26', the spacers 92', and guide plates 182 to prevent slippage of this whole assembly as it rotates and adjusts.

A pair of bearings 192 mounted on the ends of angularly disposed stationary brackets 194 press against the outside of each guide plate 182. Each bracket 194 is welded to an adjustment bushing 100' which is threaded to an externally threaded bushing 185 fixed to and extending from the mounting brackets 196 for the pillow blocks 184 and gearboxes 188. The brackets are angled inward on the side of the shaft 72' towards the drum 28'. The interaction of the brackets 194 bearing against guide plates 182 and the spacers 92' with the blades 26' causes the blade edges to converge as they rotate toward the drum 28'. As they rotate away from the drum, the resilient members 96' urge the blades apart. During their rotation, the blades, spacers, and guide plates slide back and forth along the shaft 72' as necessary to adjust to their relationship.

Mounting the blades between guide plates on a straight shaft, as above described, is a simpler and less expensive manner for effecting the desired change of blade relationship as the shaft rotates. However, this embodiment is practical only over a relatively small cutting width, approximately 6½ inches. By contrast, blades mounted on the curved shaft can be effective over a greater cutting width for a greater rate of slicing and hence better productivity.

Other means for positioning the blades to converge and diverge successively as they rotate with the shaft include the placement of stationary guides between each set of adjacent blades. These means, however, are merely other embodiments of the present inventon, differing only in form.

Having illustrated and described the principles of my invention, it should be apparent to those persons skilled in the art that the preferred embodiment may be modified without departing from such principles. I claim as my invention all such modifications as come within the spirit and scope of the following claims.

I claim:

1. An apparatus for slicing food pieces, comprising:
a plurality of laterally spaced rotatable blades; means for mounting the blades on a common straight axis; means for causing the peripheries of the blades to converge and diverge successively as the blades rotate; and means for conveying the food pieces to and through the rotating blades.

2. The apparatus of claim 1 in which the mounting means includes:
a straight shaft on which the blades rotate;
guide means adjacent the blades to cause the blade peripheries to converge on a first side of the shaft and to diverge on an opposite side of the shaft; and
positioning means between their converging and diverging positions for adjusting the blades as they rotate about the shaft.

3. The apparatus of claim 2 in which the guide means include:
guides on the ends of the shaft angled toward each other between which the blades are mounted to press the blades closer together on one side of the shaft into a fanned configuration; and
resilient spacer means between the blades which compress on the first side of the shaft to allow the blade peripheries to come together and expand on the second side of the shaft to spread the blade peripheries apart.

4. An apparatus for slicing food pieces, comprising:
a solid, integral flexible shaft having opposite ends and having a continuous surface;
means mounted to each end of the shaft supporting the shaft for rotation about a curved lengthwise axis of symmetry, the curved shaft having an inward side and an outward side;
a plurality of laterally spaced rotatable blades mounted to the shaft, each blade having an opening therein and a peripheral cutting edge, the walls of the opening engaging the shaft;
drive means operatively connected to said shaft for rotating said shaft about said axis; and
means for conveying the food pieces to and through the rotating blades,
the rotation of said shaft causing the peripheral edges of said blades to converge as they rotate on the inward side of the shaft toward plane through the axis of symmetry and to diverge as they rotate on the outward side of the shaft toward said plane.

5. The slicing apparatus of claim 4 further comprising resilient spacer means mounted between adjacent blades for maintaining the separation of the blades, said spacer means compressing as the blades converge on the inward side of the shaft and expanding as the blades diverge on the outward side of the shaft.

6. The slicing apparatus of claim 5 in which the spacer means includes spacing discs with resilient members attached thereto between adjacent faces of the blades.

7. The slicing apparatus of claim 4 which further comprises a counterrotating drum having a convex surface substantially complementary to the arc defined by the intersection of said blades with said plane on the inward side of said shaft and engaging the peripheral edges of said blades.

8. The slicing apparatus of claim 4 in which the conveying means further comprises:
a rotating drum engaging the edges of the blades;
a flume adapted to support a flow of water, the flume having an infeed end for receiving the food pieces and a spill end adjacent the drum for delivering the pieces to the point of engagement of the blades and the drum for slicing; and
means for supplying water to the inlet end of said flume.

9. The slicing apparatus of claim 4 which further comprises stabilizing means which extend between the blades for aligning them.

10. The slicing apparatus of claim 9 which further comprises cleaning means for applying a liquid to the blade surfaces for washing adhered slices from the circular blades.

11. The slicing apparatus of claim 10 in which the cleaning means includes a comb with hollow fingers through which a liquid is sprayed for washing the slices from the blades and shaft.

12. An apparatus for slicing food pieces in which a water conveying means conveys the food pieces to and through rotating blades for slicing, the improvement comprising:
a flume having a first end for receiving food pieces and a second end of sufficient depth for delivering the pieces without contact with the flume to the blades for slicing; and
means within the flume for submerging the pieces to a predetermined depth whereby, when released, the pieces float freely upward to orient themselves according to their buoyancy upon reaching the surface.

13. The slicing apparatus of claim 12 in which the submerging means includes an inclined flighted conveyor having a first end positioned above the surface of the water to engage the pieces after they have been fed into the flume and a second, discharge end positioned at said predetermined depth beneath the water, the pieces floating freely from the second end to rise to the surface.

14. An apparatus for slicing mushrooms, comprising:
a solid, flexible shaft having opposite ends;
means mounted to each end of the shaft supporting the shaft for rotation about a curved lengthwise axis of symmetry, the curved shaft having an inward and an outward side;
drive means operatively connected to said shaft for rotating said shaft about said axis;
a plurality of laterally spaced circular blades, each having a peripheral cutting edge, the blades mounted directly to the shaft for rotation therewith, the blades converging on the inward side of the shaft toward a plane through the axis of symmetry and diverging on the outward side of the shaft toward said plane;
a flume having a first end for receiving mushrooms and a second end of sufficient depth for delivering the mushrooms without contact with the flume to the blades for slicing;
an inclined flighted conveyor having a first end positioned above the surface of the water adjacent the first end of the flume to engage the mushrooms after they have been fed into the flume and a second, discharge end positioned at said sufficient depth beneath the water that the mushrooms floating freely upward from the second discharge end substantially orient themselves head end up upon reaching the surface; and
a counterrotating drum adjacent the second end of the flume, said drum having a convex surface substantially complementary to the arc defined by the intersection of said blades with said plane on the inward side of said shaft and engaging the peripheral edges of said blades to assist said blades in slicing the oriented mushrooms delivered by the flume thereto.

15. A method of slicing mushrooms, comprising:
providing a set of spaced-apart cutting blades;
providing a flume through which water of a depth greater than height of a mushroom flows;
feeding the mushrooms into one end of the flume through which water flows;
submerging the mushrooms in the flume to a depth sufficient to ensure that they will substantially orient themselves head end up upon surfacing;
allowing the mushrooms to float freely upward from the depth;
conveying the oriented mushrooms toward the blades by means of water flow in the flume;
operating the cutting blades to cause their adjacent faces to converge and diverge successively;
feeding said mushrooms to the blades as the blades commence to diverge;
slicing said mushrooms within the blades; and
spraying a liquid between the blades in their divergent position to remove any slices adhering the blades.

16. The apparatus of claim 14 in which the shaft is composed of a resilient material capable of being deformed to accept each blade and of recovering its shape to grip each blade.

17. The apparatus of claim 16 in which the sheet is composed of polyurethane.

18. An apparatus for slicing food pieces, comprising:
a solid, integral shaft having a continuous surface;
means for rotating the shaft;
a plurality of laterally spaced rotatable blades mounted to the shaft, each blade having an opening therein with the wall of the opening engaging the shaft;
means for causing the peripheries of the blades to converge and diverge successively as the blades rotate; and
means for conveying the food pieces to and through the rotating blades.

* * * * *

UNITED STATES PATENT AND TRADEMARK OFFICE
CERTIFICATE OF CORRECTION

PATENT NO. : 4,590,829

DATED : May 27, 1986

INVENTOR(S) : Arthur R. Davidson and Richard S. Livermore

It is certified that error appears in the above-identified patent and that said Letters Patent is hereby corrected as shown below:

Claim 4, Column 9, line 40, before "plane" insert --a--.

Claim 15, Column 12, line 2, after "adhering" insert --to--.

Claim 17, Column 12, line 8, change "sheet" to --shaft--.

Signed and Sealed this

Second Day of September 1986

[SEAL]

Attest:

DONALD J. QUIGG

Attesting Officer

Commissioner of Patents and Trademarks